United States Patent
Walters

(10) Patent No.: US 7,929,974 B1
(45) Date of Patent: Apr. 19, 2011

(54) METHOD AND SYSTEM FOR MANAGING CARRIER FREQUENCIES IN A WIRELESS COMMUNICATION NETWORK

(75) Inventor: David L. Walters, Oswego, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 533 days.

(21) Appl. No.: 12/034,428

(22) Filed: Feb. 20, 2008

(51) Int. Cl.
  *H04W 72/00* (2009.01)
(52) U.S. Cl. ..................... 455/453; 370/395.4
(58) Field of Classification Search .................. 455/450, 455/509, 435.3, 452.2, 453, 464
  See application file for complete search history.

(56) References Cited

U.S. PATENT DOCUMENTS

| | | |
|---|---|---|
| 2003/0073444 A1 | 4/2003 | Kogiantis et al. |
| 2003/0223429 A1* | 12/2003 | Bi et al. ............ 370/395.4 |
| 2004/0213182 A1 | 10/2004 | Huh et al. |

FOREIGN PATENT DOCUMENTS

EP  1294203  3/2003

* cited by examiner

*Primary Examiner* — Tu X Nguyen

(57) ABSTRACT

A method and system are provided for managing a radio access network (RAN). The RAN defines one or more wireless coverage areas (WCAs) to serve one or more mobile nodes (MNs). Each MN requests data from the RAN at a requested forward-link data rate and the RAN transmits data to the MN at an actual forward-link data rate.

For each WCA, an average of the actual forward-link data rates, an average of the requested forward-link data rates, and an RF-link utilization is determined. The RF-link utilization of the WCA is determined by dividing the average actual forward-link data rate of the WCA by the average requested forward-link data rate of the WCA. The RAN is managed by scheduling the addition of one or more carrier frequencies to one or more WCAs, where the scheduling is based on the RF-link utilization of the WCAs.

16 Claims, 5 Drawing Sheets

METHOD AND SYSTEM FOR MANAGING CARRIER FREQUENCIES IN A WIRELESS COMMUNICATION NETWORK

BACKGROUND

Many people use mobile nodes, such as cell phones and personal digital assistants (PDAs), to communicate with wireless communication networks. These mobile nodes and networks typically communicate over a radio-frequency (RF) air interface according to a wireless protocol such as Code Division Multiple Access (CDMA), perhaps in conformance with one or more industry specifications such as IS-95, IS-856, and IS-2000. Other protocols may be used as well, such as iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and others now known or later developed.

In a wireless communication network operating according to the well known IS-856 (e.g., 1xEV-DO) standard, data transmissions occur from the wireless communication network to one or more mobile nodes. The data transmissions occur on a time-division-multiplexed basis, in which the wireless communication network typically communicates with a single mobile node in a given time slot. The data transmissions from the wireless communication network to a given mobile node are said to occur on a forward link, while those from a given mobile node to the wireless communication network are said to occur on a reverse link.

Under IS-856, mobile nodes assess air-interface conditions and then use these assessments to request particular data rates by sending what is known as data rate control (DRC) information to the wireless communication network. In particular, each mobile node monitors the signal-to-noise ratios of signals it receives from various sectors of the wireless communication network and selects a serving sector that has the best (highest) detected signal-to-noise ratio. Applying a simple correlation table, the mobile node then determines a "DRC value" that corresponds with the measured signal-to-noise ratio, and the mobile node sends to the wireless communication network a DRC message specifying the determined DRC value for forward-link communication. The network then correlates the provided DRC value to a data rate at which the network should transmit data to the mobile node. When the mobile node later requests data communication from the network, the network transmits data to the mobile node on the forward link at the requested data rate, if possible.

Wireless communication networks—including EV-DO networks—typically include a plurality of base stations, each of which provides one or more wireless coverage areas. A wireless coverage area of a base station has a respective radiation pattern that defines one or more sectors. A mobile node positioned in one of these wireless coverage areas can communicate over the air interface or "RF-link" with the base station, which may provide the mobile node access to one or more circuit-switched, packet-switched, and/or other transport networks. Mobile nodes and base stations conduct RF-link communication sessions (e.g. voice calls and data sessions) over frequencies known as carrier frequencies. Using a sector as an example of a coverage area, base stations may provide service in a given sector on one or more carrier frequencies.

A wireless service provider may manage a wireless communication network to provide sufficient bandwidth for requested data-communication sessions in the wireless communication network. If insufficient bandwidth is available to serve all requests for data-communication sessions in one or more sectors of the wireless communication network, the wireless service provider may add capacity to the wireless communication network, such as by adding one or more carrier frequencies to each of one or more sectors having insufficient bandwidth (i.e., capacity). However, adding capacity to a wireless communication network often requires a significant expenditure of capital and time.

Overview

Disclosed herein are methods and systems for managing carrier frequencies in a wireless communication network. The method involves evaluating each of various wireless coverage areas in the network to determine, for each wireless coverage area, the extent to which the wireless coverage area is being utilized to provide communication service, relative to the capacity of the wireless coverage area. Based on the determined utilization per wireless coverage area, the various wireless coverage areas may be prioritized for carrier-frequency addition.

More particularly, for each wireless coverage area, a computing device may calculate a utilization ratio reflecting the extent to which capacity of the wireless coverage area has been used. To calculate the utilization ratio, (i) the computing device may determine an extent of data actually transmitted in the wireless coverage area and a capacity of the wireless coverage area to support data transmissions, and then (ii) the computing device may apply an algorithm comprising dividing the extent of actual data transmission by the capacity of the wireless coverage area to support data transmissions. Preferably, as a measure of the capacity to support data transmissions, the computing device may use the average requested data rate indicated by DRC values or the like for the wireless coverage area, since those requested data rates may represent the quality of the air interface and, thus, theoretically, the capacity of the wireless coverage area to support data transmissions.

Given the utilization ratios of the various wireless coverage areas, the computing device may then prioritize the wireless coverage areas for addition of carrier frequencies thereto. In particular, the computing device may rank the wireless coverage areas based, at least in part, on their computed utilization ratios, such that the highest ranked wireless coverage areas have the highest utilization ratios. Then, the computing device may schedule addition of carrier frequencies to the highest ranked wireless coverage areas ahead of other wireless coverage areas. Advantageously, the computing device may thereby enable prioritized addition of carrier frequencies to the wireless coverage areas most in need of additional carrier frequencies.

In one respect, an exemplary method may thus be carried out in a system comprising a radio access network (RAN) that defines a plurality of wireless coverage areas for serving a plurality of mobile nodes. In normal operation, each mobile node requests a forward-link data rate for data transmission and receives data at an actual forward-link data rate.

In this context or the like, the exemplary method involves, for each wireless coverage area, determining an average of the actual forward-link data rates, determining an average requested forward-link data rate, and determining a RF-link utilization by applying an algorithm comprising dividing the determined average actual forward-link data rate by the determined average requested forward-link data rate. In turn, the exemplary method then involves managing carrier frequencies by scheduling an addition of at least one carrier frequency to one or more wireless coverage areas based at least in part on the determined RF-link utilization for the one or more wireless coverage areas.

In a second respect, an exemplary system may comprise a network-communication interface, data storage, a processing unit, and machine-language instructions stored in the data storage and executable by the processing unit. In this context or the like, the network-communication interface receives a plurality of communication records associated with a plurality of wireless coverage areas. The plurality of communication records reflect requested forward-link data rates and actual forward-link data rates. The received plurality of communication records are stored in the data storage.

For each wireless coverage area identified in the stored plurality of communication records, the machine-language instructions of the exemplary system are executable to: determine an average actual forward-link data rate for the wireless coverage area, determine an average of the plurality of requested forward-link data rates, and determine an RF-link utilization by applying an algorithm comprising dividing the determined average actual forward-link data rate by the determined average requested forward-link data rate. Then, the machine-language instructions of the exemplary system are executable to schedule the addition of one or more carrier frequencies to one or more wireless coverage areas based, at least in part, on the determined RF-link utilizations for the one or more wireless coverage areas.

These as well as other aspects and advantages will become apparent to those of ordinary skill in the art by reading the following detailed description, with reference where appropriate to the accompanying drawings. Further, it is to be understood that this overview and other descriptions provided herein do not necessarily limit the invention but are instead provided as examples only.

BRIEF DESCRIPTION OF THE DRAWINGS

Exemplary embodiments of the present invention are described herein with reference to the drawings, in which.

DETAILED DESCRIPTION

1. Exemplary Architecture

Figure 1:
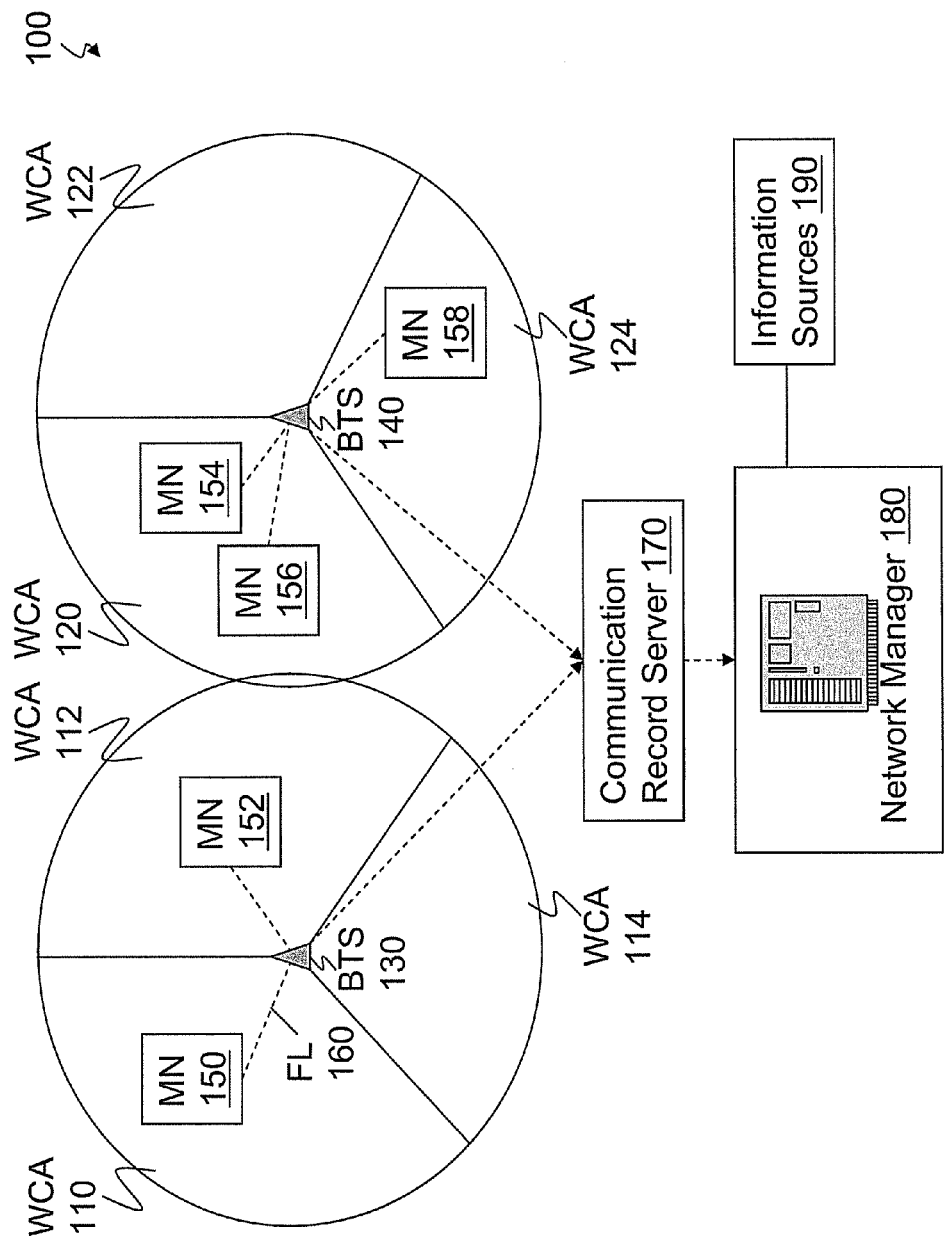
FIG. 1 shows an exemplary communication system that includes a plurality of mobile nodes communicating within a plurality of wireless coverage areas.

Referring to now the drawings, FIG. 1 shows an exemplary radio access network (RAN) that includes a plurality of mobile nodes communicating within a plurality of wireless coverage areas. It should be understood, of course, that variations from this and other arrangements shown and described herein are possible. For instance, elements can be added, removed, combined, distributed, re-ordered, or otherwise modified. Further, it should be understood that functions described herein as being carried out by one or more entities can be carried out by one or more suitably programmed processors or by any combination of hardware, software, and/or firmware.

As shown in FIG. 1, the exemplary RAN 100 includes a plurality of wireless coverage areas 110, 112, 114, 120, 122, and 124 to serve mobile nodes (MNs) 150, 152, 154, 156, and 158. The wireless coverage areas 110-124 operate according to any air-interface protocol now known or later developed, examples of which include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth. In particular, the wireless coverage areas 110-124 may operate using a 1xEV-DO air-interface protocol compliant with the well-known IS-856 standard.

Each wireless coverage area is defined by radiation from a base transceiver station (BTS). As shown in FIG. 1, a BTS 130 radiates to define wireless coverage areas 110, 112, 114, and a BTS 140 radiates to define wireless coverage areas 120, 122, and 124. A BTS may serve zero, one, or more than one mobile node in a wireless coverage area at any given time. For example, FIG. 1 shows zero MNs being served in wireless coverage area 114, one MN being served in wireless coverage area 112, and two MNs being served in wireless coverage area 120.

While being served by RAN 100, each MN is in at least one wireless coverage area. As shown in FIG. 1, for example, MN 150 is in wireless coverage area 110, MN 152 is in wireless coverage area 112, the MNs 154 and 156 are in wireless coverage area 120, and MN 158 is in wireless coverage area 124. Note that a MN may move between wireless coverage areas while being served by the RAN 100. For example, the BTS 130 may serve the MN 150 as long as MN 150 is in any one of the three wireless coverage areas 110, 112, and 114 radiated by the BTS 130. If the MN 150 moves to a wireless coverage area not radiated by BTS 130, the MN 150 may be served by a different BTS in the RAN 100. For example, if the MN 150 moves to the wireless coverage area 120, the MN 150 may be served by the BTS 140.

A mobile node such as MN 150 may request voice and/or data-communication service from the RAN 100. Specifically, the MN 150 may send a data-communication request to a BTS, such as BTS 130. The data-communication request from the MN 150 also may include a request that the network transmit data at a specific rate on a forward link, i.e. at a specific "forward-link data rate." After the MN 150 sends the data-communication request, the BTS 130 may establish data communication with the MN 150. Once the BTS 130 establishes data communication with MN 150, the BTS 130 may transmit data to the MN 150 on the forward link 160 at an actual forward-link data rate. Also, the BTS 130 may receive data from the MN 150 on a reverse link at an actual reverse-link data rate. Eventually, the data communication between the MN 150 and the RAN 100 may terminate.

Under IS-856, the MN 150 may repeatedly send requests for particular forward-link data rates to an access network, such as the RAN 100, where the requests take the form of particular DRC values. Before sending a particular DRC value, the MN 150 observes the condition of the air interface, such as observing a signal-to-noise ratio of the air interface. Based on the observation of the condition of the air interface, the MN 150 selects a DRC value. For example, the MN 150 may select a DRC value by use of a lookup table, keyed by the signal-to-noise ratio, to find the DRC value. The MN 150 then sends the particular DRC value to the access network.

The BTS 130 receives the DRC value from the MN 150. The BTS 130 interprets the selected DRC value as a requested forward-link data rate. The BTS 130 then serves the MN 150 by transmitting data at an actual forward-link data rate to MN 150 via the forward link 160. Eventually, the data transmission between the BTS 130 and the MN 150 may complete.

The operator of the RAN 100 may require information about a specific communication, such as the data communication between the BTS 130 and the MN 150 described above, for network planning, regulatory compliance, billing, and other purposes. The operator may store the information about each specific communication in one or more communication records (CRs). The information stored in a CR may include information on mobile-node usage, BTS usage, time and duration of the communication, an amount of data transmitted during a data communication, and other information about the specific communication.

Elements of the RAN 100 may create the one or more CRs 176. The BTSs 130 and 140 may create one or more CRs 176 to record information about a data transmission between each respective BTS and a mobile node. The BTSs 130 and 140 may create and/or update the one or more CRs 176 while establishing data communication, during data transmission, and after the data transmission is complete.

The BTSs 130 and 140 may transmit a plurality of CRs 176 to a communication record server 170. The transmission of the plurality of CRs 176 is indicated in FIG. 1 by use of dashed arrows from BTSs 130 and 140 to the communication record server 170. The BTSs 130 and 140 may transmit the plurality of CRs 176 to the communication record server 170 as the plurality of CRs 176 are created, periodically, upon request by the communication record server 170, or perhaps according to some other approach. The BTSs 130 and 140 may delete their copies of the plurality of CRs 176 after transmission of the plurality of CRs 176 to the communication records server 170.

The communication records server 170 may transmit the plurality of CRs 176 to a computing device acting as a network manager 180. The plurality of CRs 176 may contain information useful in managing the RAN 100, such as BTS usage, time and duration of communications within the RAN 100, requested forward-link data rates, and actual forward-link data rates. The communication record server 170 may transmit the plurality of CRs 176 to the network manager 180 as the plurality of CRs 176 are received by the communication record server 170, periodically, upon request by the network manager 180, or perhaps according to some other approach.

The network manager 180 may manage the RAN 100, and in particular, may schedule the addition of carrier frequencies to the RAN 100. The network manager 180 may perform its scheduling function by processing the information stored in the plurality of CRs 176, information sources 190, or a combination thereof. The information sources 190 may comprise network management tools, information available from other network managers, and other sources of information about the operation of the RAN 100. One such network management tool is the FLUX tool provided by National RF Department of the Sprint Nextel Corporation that provides hourly measurements of actual forward-link data rates.

The network manager 180 may process the plurality of CRs 176 to determine one or more key network indicators and manage the RAN 100 based on the one or more key network indicators. In particular, the network manager 180 may determine a key network indicator referred herein as a "RF-link utilization" to schedule the addition of carrier frequencies to the RAN 100. The network manager 180 may determine the RF-link utilization—on a coverage-area-by-coverage-area basis—from an average of the actual forward-link data rates and an average of the requested forward-link data rates.

Alternatively, a single network device may perform the functions of the communication record server 170 and the network manager 180. In another alternative, one or more processors in one or more BTSs 130 and 140 in the RAN 100 may act as the network manager 180, and certainly other possibilities exist as well.

Figure 2:
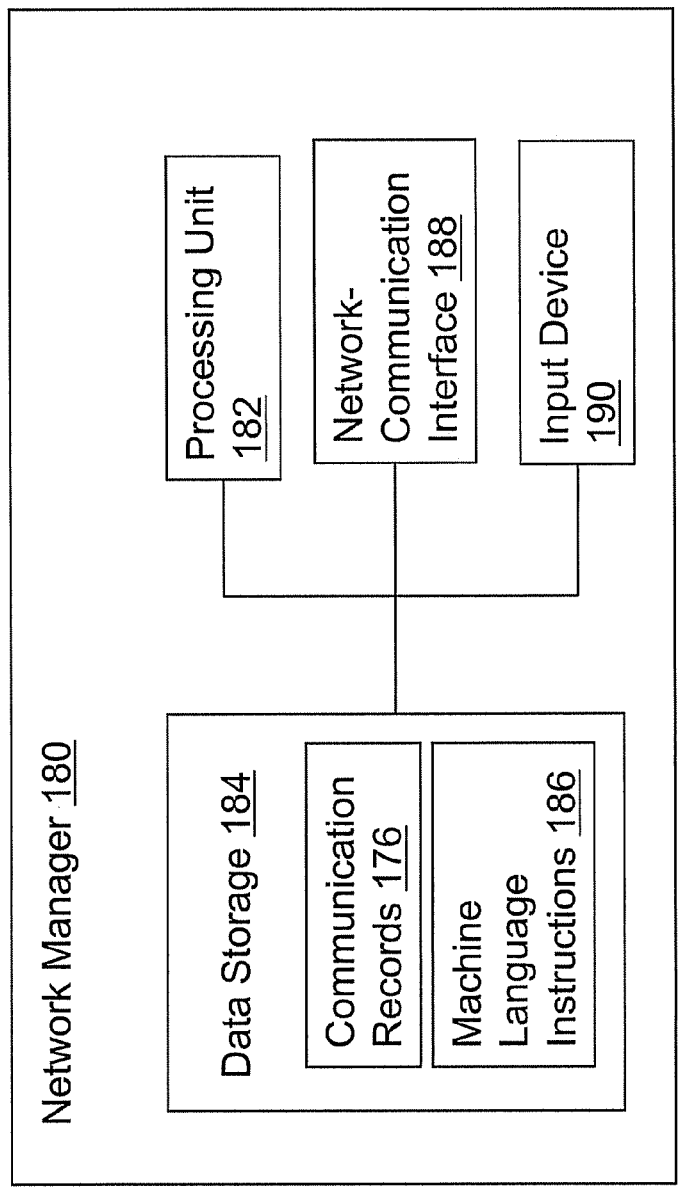
FIG. 2 is a block diagram of a network manager.

FIG. 2 is a block diagram of the network manager 180, which is a computing device comprising a processing unit 182, a data storage 184, a network-communication interface 188, and an input device 190. The processing unit 182 may include one or more central processing units, computer processors, mobile processors, digital signal processors (DSPs), microprocessors, computer chips, and similar processing units now known and later developed and may execute machine-language instructions and process data.

The data storage 184 may comprise one or more storage devices. The data storage 184 may include read-only memory (ROM), random access memory (RAM), removable-disk-drive memory, hard-disk memory, magnetic-tape memory, flash memory, and similar storage devices now known and later developed. The data storage 184 comprises at least enough storage capacity to contain a plurality of CRs 176 and machine-language instructions 186. The machine-language instructions 186 contained in the data storage 184 include instructions executable by the processing unit 182 to perform some or all of the functions of the network manager 180 described herein, perhaps along with one or more additional functions.

The network-communication interface 188 is configured to receive at least the plurality of CRs 176 from communication records server 170. The network-communication interface 188 may include a wired network-communication interface and/or a wireless network-communication interface. The network-communication interface may comprise an interface utilizing a wire, cable, fiber-optic link or similar physical connection to a wide area network (WAN), a local area network (LAN), one or more public data networks, such as the Internet, one or more private data networks, or any combination of such networks. The network-communication interface may instead or in addition comprise an interface utilizing an air interface to a wide area network (WAN), a local area network (LAN), one or more public data networks (e.g. the Internet), one or more private data networks, or any combination of public and private data networks.

The input device 190 may provide user input from a user of the network manager 180. The input device 190 may comprise a keyboard, a keypad, a touch screen, a computer mouse, a track ball, a joystick, and/or other similar devices, capable of providing user input, now known or later developed.

2. A Depiction of Adding a Carrier Frequency

One manner of adding capacity to a wireless coverage area is to add a carrier frequency to the wireless coverage area and allow signal transmission on the added carrier frequency. Before a carrier frequency is added to a wireless coverage area defined by a BTS, the BTS may already radiate on one or more initially-active carrier frequencies to define the wireless coverage area and serve mobile nodes in the wireless coverage area. The operator of the RAN 100 may add a carrier frequency to the wireless coverage area by configuring a BTS and/or associated RF equipment, such as antenna equipment, to radiate in the wireless coverage area on the carrier frequency. After the addition of the carrier frequency, the BTS and associated RF equipment radiate on the added carrier frequency, as well as continuing to radiate on the one or more initially-active carrier frequencies. Then, mobile nodes in the wireless coverage area can receive the radiated signals from the BTS (and thus be served) on the added carrier frequency, as well as on the one or more initially-active carrier frequencies.

Figure 3:
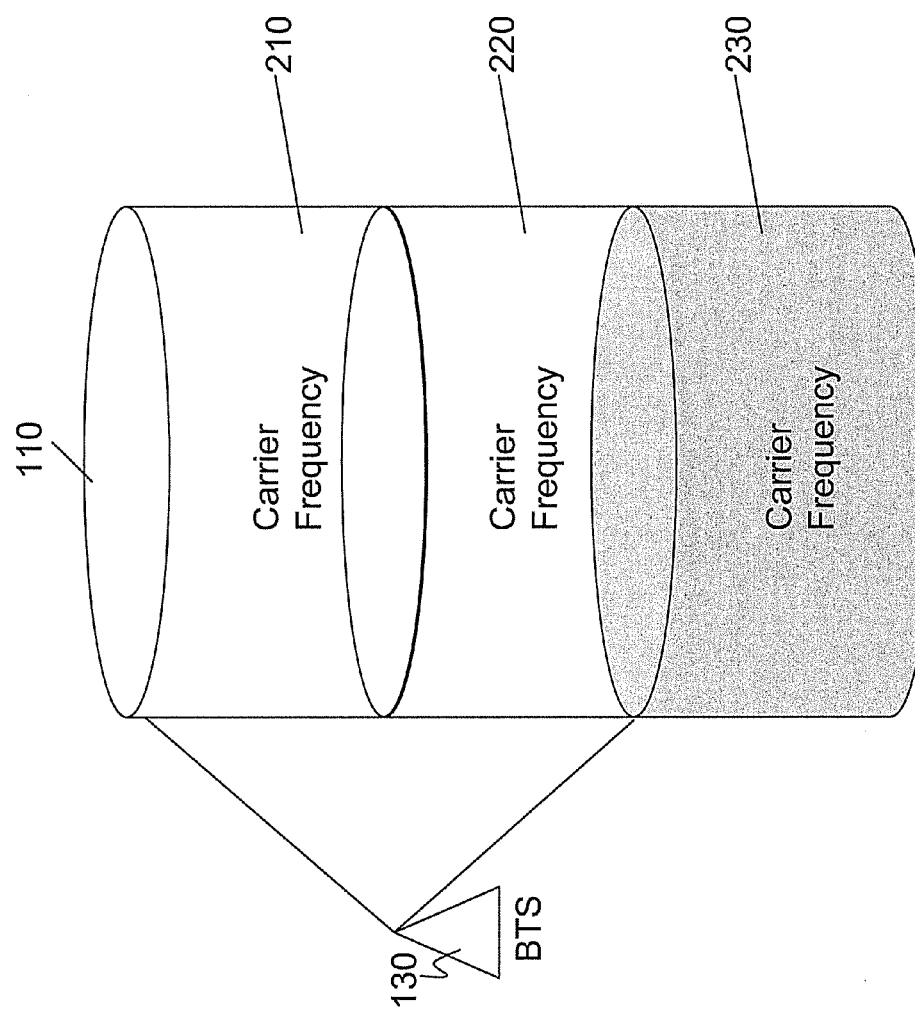
FIG. 3 depicts an addition of a carrier frequency to a wireless coverage area.

The effect of adding a carrier frequency to the capacity of a BTS is shown in FIG. 3. The BTS 130 defines wireless coverage area 110 initially by radiating on initially-active carrier frequencies 210 and 220. FIG. 3 also shows an addition of a carrier frequency 230 to wireless coverage area 110. Once the carrier frequency 230 is added to wireless coverage area 110, the BTS 130 radiates on carrier frequencies 210, 220, and 230 throughout wireless coverage area 110.

Generally, adding M carrier frequencies to a wireless coverage area with N initially-active carrier frequencies will result in an increase of the capacity of the wireless coverage area to (M+N)/N of the original capacity of the wireless coverage area. For the example shown in FIG. 3 of two initially-active carrier frequencies 210 and 220 in the wireless coverage area 110 and one added carrier frequency 230, the addition of the one added carrier frequency 230 will result in an increase of the capacity of the wireless coverage area to 3/2 (or 150%) of the original capacity of the wireless coverage area.

3. An Exemplary Format of a Communications Record

Figure 4:
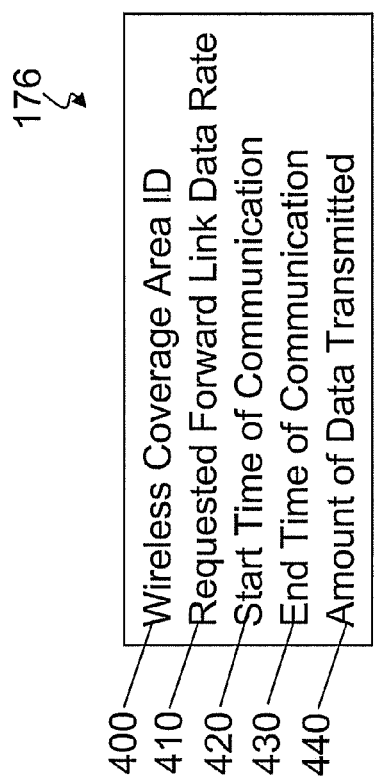
FIG. 4 is an exemplary format of a communication record.

FIG. 4 shows an exemplary format of a CR 176. Each of the plurality of CRs 176 may comprise a plurality of fields for recording information about part or all of a specific communication between a mobile node and the RAN 100. The plurality of fields of CR 176 may include: a wireless coverage area identifier (ID) 400, a requested forward-link data rate 410, a start time of communication 420, an end time of communication 430, and an amount of data transmitted 440. It is to be understood that a CR 176 may have more or fewer fields of information than described herein.

The wireless coverage area ID 400 identifies the wireless coverage area where the specific communication occurred and associates the CR with a specific wireless coverage area. The requested forward-link data rate 410 specifies a requested forward-link data rate for the specific communication. Preferably, the requested forward-link data rate 410 takes the form of a DRC value. The start time of communication 420 and end time of communication 430 are the starting and ending times, respectively, of the specific communication. Alternatively, the information in the start time of communication 420 and end time of communication 430 may be augmented with or replaced by a duration-of-communication field that specifies the duration of the specific communication.

The amount of data transmitted 440 is a value representing the actual amount of data transmitted from the RAN 100 to the mobile node over the forward link. Using the information in communication record 176, the actual forward-link data rate for the specific communication may be determined by: (1) calculating the duration of the communication from the start time of communication 420 and end times of communication 430, and (2) dividing the amount of data transmitted by the duration of the communication 440.

4. An Exemplary Method for Managing a RAN

Figure 5:
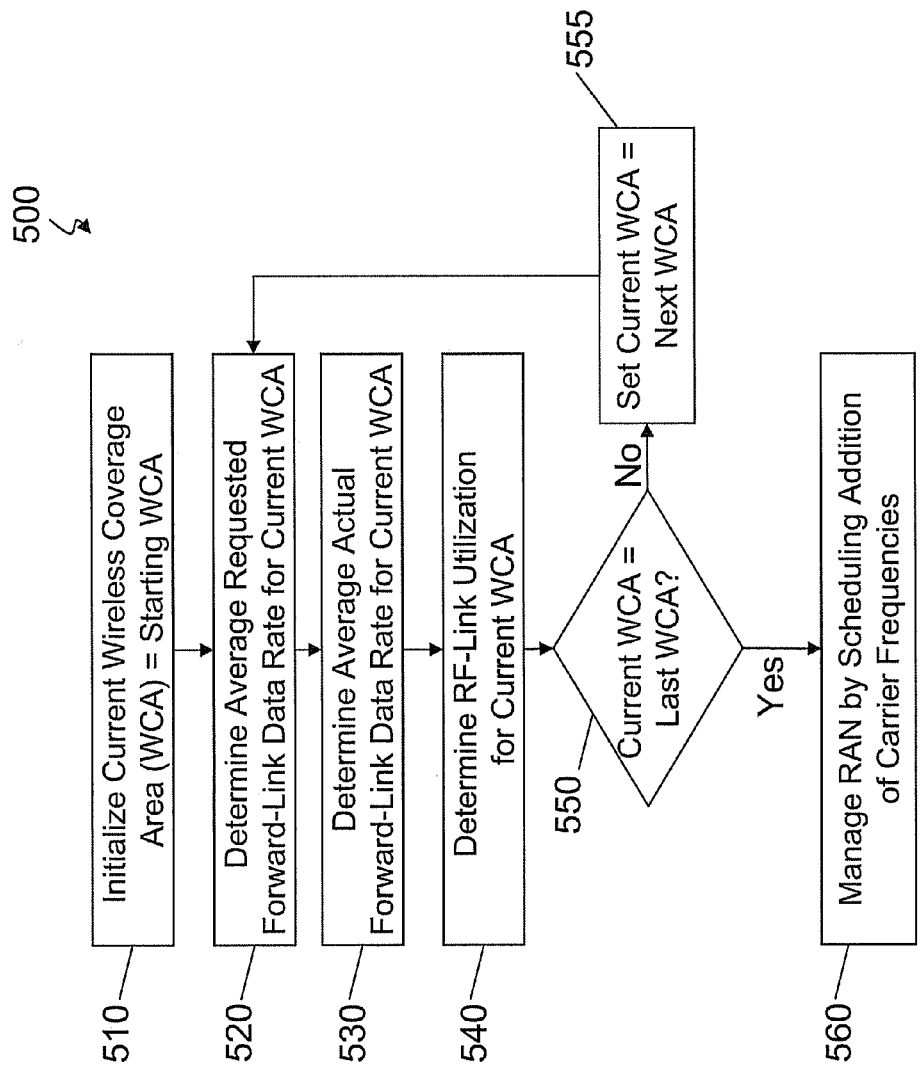
FIG. 5 is a flowchart of an exemplary method for scheduling and adding one or more carrier frequencies to one or more wireless coverage areas.

FIG. 5 depicts a method 500 for managing the RAN 100 by scheduling the addition of one or more carrier frequencies to the RAN 100 and then adding one or more carrier frequencies to the RAN 100. Part or all of method 500 may be a computerized method executable on the network manager 180 or similar computing device. The RAN 100 may comprise a data-communication system providing data service compliant with IS-856.

In the preferred implementation, the method 500 operates as follows with corresponding blocks illustrated in FIG. 5. Block 510 of the method 500 comprises setting a current wireless coverage area variable termed "current WCA" to the ID of an initial (i.e., starting (first in a list)) wireless coverage area.

Block 520 of the method 500 comprises determining an average requested forward-link data rate for current WCA. The requested forward-link data rate may be determined by processing a plurality of communication records. Preferably, each CR 176 in the plurality of CRs comprises the fields of information shown in FIG. 4. Processing a plurality of CRs 176 to determine the average requested data rate for current WCA comprises: (i) summing the requested forward-link data rate 410 in each CR 176 that has a wireless coverage area ID 400 equal to current WCA, and (ii) dividing the sum of the requested forward-link data rates by a count of the number of communication records in the plurality of CRs that have a wireless coverage area ID 400 equal to current WCA.

If a value in a CR 176 for the requested forward-link data rate 410 represents a range of requested forward-link data rates, the requested forward-link data rate used by the network manager 180 may be: (a) the lowest value of the range, (b) the mid point of the range, or (c) the highest value of the range, among other options. In determining the count of the plurality of CRs, the block 520 may comprise excluding each CR 176 with a null or zero value for the requested forward-link data rate 410.

The block 520 may comprise determining an average requested forward-link data rate in current WCA for all communications that occurred during a first fixed period of time. The first fixed period of time should be long enough to allow meaningful statistical sampling yet as short as possible to minimize the amount of processing required to determine the average requested forward-link data rate. Preferably, the first fixed period of time is one day.

To average the requested forward-link data rates in current WCA over a first fixed period of time, the block 520 may comprise determining a first start time and a first end time of the first fixed period of time. The block 520 may comprise determining the first start time and/or the first end time via user input.

The block 520 may comprise filtering the plurality of CRs 176 to identify communications that occurred during the first fixed period of time in current WCA. The block 520 may comprise filtering the plurality of CRs 176 by scanning the plurality of CRs 176 and retaining each CR 176: (i) whose wireless coverage area ID 400 equals current WCA and (ii) represents a communication occurring during the first fixed period of time. The block 520 may comprise determining that a CR 176 represents a communication occurring during the first fixed period time if the CR 176 either: (a) has a start time of communication 420 after the first start time, (b) has an end time of communication 430 before the first end time, or (c) has a start time of communication 420 after the first start time and has an end time of communication 430 before the first end time, among other possibilities. The block 520 may comprise filtering the plurality of CRs 176 to exclude each CR 176 with a zero or null value of the requested forward-link data rate 410. Other possibilities exist as well, without departing from the spirit of the invention.

The block 520 may comprise determining the average requested forward-link data rate based on the first filtered plurality of communication records. To determine the average requested forward-link data rate, the block 520 may comprise summing each requested forward-link data rate 410 in the first filtered plurality of communication records and counting the number of the first filtered plurality of communication records. The block 520 may comprise determining the average requested forward-link data rate by dividing the sum of the requested forward-link data rates in the first filtered plurality of communication records by the count of the first filtered plurality of communication records. Alternatively, the block 520 may comprise receiving the average requested forward-link data rate during the first fixed period of time from an information source 190.

Block 530 of the method 500 comprises determining an average actual forward-link data rate for current WCA. The block 530 may comprise determining the average actual forward-link data rate for current WCA by processing the plurality of CRs 176.

The block 530 may comprise determining the average actual forward-link data rate by first scanning for each CR 176 in the plurality of CRs 176 that has a wireless coverage area ID 400 equal to current WCA. For each CR 176 with wireless coverage area equal to current WCA, the block 530 may comprise: (1) determining a duration of the communication by subtracting the end time of communication 430 from the start time of communication 420 and (2) determining an actual forward-link data rate by dividing the amount of data transmitted 440 by the duration. The block 530 may comprise adding the actual forward-link data rate to a sum of actual forward-link data rates. The block 530 may also comprise determining a count of the CRs 176 in the plurality of CRs 176 with wireless coverage area ID equal to current WCA.

When all CRs 176 are processed, the block 530 may comprise determining the average actual forward-link data rate by dividing the sum of actual forward-link data rates by the count of the CRs 176 in the plurality of CRs 176 with wireless coverage area ID equal to current WCA.

The block 530 may comprise determining an average actual forward-link data rate for current WCA over a second fixed period of time. The block 530 may comprise determining a second start time and a second end time for the second fixed period of time, and user input may determine the second start time and second end time.

The block 530 may comprise determining the average actual forward-link data rate over the second fixed period of time by filtering the plurality of CRs 176 in a similar fashion as described in determining the average requested forward-link data rate over the first fixed period of time. Specifically, the block 530 may comprise filtering the plurality of CRs 176 to determine a second filtered plurality of CRs 176, wherein each CR 176: (a) has the wireless coverage area ID 400 equal to current WCA and (b) represents a communication occurring during the second fixed period of time.

A CR 176 may represent a communication occurring during the second fixed period of time if the CR 176 either: (a) has a start time of communication 420 after the second start time, (b) has an end time of communication 430 before the second end time, or (c) has a start time of communication 420 after the second start time and has an end time of communication 430 before the second end time, among other possibilities. In determining the second filtered plurality of CRs 176, each CR 176 with a zero or null value for amount of data transmitted 440 may be discarded. Other possibilities exist as well, without departing from the spirit of the invention.

The block 530 may comprise determining the average actual forward-link data rate based on the second filtered plurality of CRs 176. To determine the average actual forward-link data rate, the block 530 may comprise determining a sum of the actual forward-link data rates in the second filtered plurality of CRs 176 and a count of the CRs 176 in the second filtered plurality of CRs 176, as described above. The block 530 may comprise determining the average actual forward-link data rate in the second filtered plurality of CRs 176 by dividing the sum of the actual forward-link data rates in the second filtered plurality of CRs 176 by the count of the second filtered plurality of CRs 176. Alternatively, an information source 190 may provide the average actual forward-link data rate over the second fixed period of time.

Preferably, the second fixed period of time is an hour. The second fixed period of time may be a "busy hour" of a day. The busy hour of the day may be an hour in which the average of the actual forward-link data rates is at a maximum in comparison with the remainder of the hours of the day. The busy hour of the day is preferably used as the second fixed period of time, as the busy hour of the day is the hour where the maximum amount of data is transmitted in current WCA.

At block 540, the method 500 comprises determining an RF-link utilization for current WCA, perhaps involving dividing the average actual data rate for current WCA by the average requested data rate for current WCA.

At block 550, the method 500 comprises determining if current WCA, which is the wireless coverage area currently being processed, is the last wireless coverage area that needs to be processed. If not, (i.e. there are more wireless coverage areas to process), the method 500 proceeds to block 555, where current WCA is set to the ID of the next wireless coverage area to process, and then the method 500 proceeds to block 520. If so (i.e. there are no more wireless coverage areas to process), the method 500 proceeds to block 560, which comprises managing the RAN 100 by scheduling an addition of at least one carrier frequency to at least one wireless coverage area based, at least in part, on the determined RF-link utilization for the at least one wireless coverage area.

Scheduling the addition of at least one carrier frequency to at least one wireless coverage area may comprise generating a list of at least one wireless coverage area for the addition of at least one carrier frequency and/or generating one or more work orders for the addition at least one carrier frequency to at least one wireless coverage area. Note that actually adding at least one carrier frequency to at least one wireless coverage area in the RAN 100 is an additional procedure that is separate and distinct from scheduling of the addition of at least one carrier frequency.

The block 560 may comprise comparing the RF-link utilization for a given wireless coverage area with a threshold, where user input may determine the threshold. If the RF-link utilization for the given wireless coverage area exceeds the threshold, the block 560 may comprise scheduling an addition of at least one carrier frequency to the given wireless coverage area.

The block 560 may schedule the addition of at least one carrier frequency to at least one wireless coverage area based, at least in part, on a priority for each wireless coverage area. The block 560 may comprise determining the respective priority for each wireless coverage area. The respective priority of each wireless coverage area may be based, at least in part, on the RF-link utilization of the wireless coverage area. Specifically, the priority of a wireless coverage area may be the RF-link utilization for the wireless coverage area. The block 560 may comprise use of a threshold priority, wherein user input may determine the threshold priority. The threshold priority may be compared to the determined priority for each wireless coverage area. If the priority for the wireless coverage area exceeds the threshold priority, the block 560 may comprise scheduling the addition of at least one carrier frequency to the wireless coverage area.

The block 560 may comprise scheduling the addition of at least one carrier frequency to each of P wireless coverage areas, wherein the P wireless coverage areas have the P highest determined priorities and P is preferably greater than 0. In particular, the block 560 may comprise scheduling the addition of exactly one carrier frequency to each of the P wireless coverage areas. P may be determined by user input.

The block 560 may comprise determining the number of carrier frequencies to be added to the wireless coverage area based, at least in part, on the priority of the wireless coverage area. For example, a highest-priority wireless coverage area with a priority value that is higher than that of all of the other wireless coverage areas in the RAN 100 may have two or more carrier frequencies scheduled to be added to the highest-priority wireless coverage area.

More generally, the block 560 may comprise comparing a priority of a wireless coverage area to one or more threshold priorities and scheduling the addition of one or more numbers of carrier frequencies to a given wireless coverage area. Responsive to the priority for a given wireless coverage area exceeding a first threshold priority, the block 560 may comprise determining that a first number of carrier frequencies are to be added to the given wireless coverage area. Similarly, if the priority for the given wireless coverage area exceeds a second threshold priority, the block 560 may comprise determining a second number of carrier frequencies are to be added to the given wireless coverage area, and so on. User input may determine the one or more threshold priorities and/or the one or more corresponding numbers of carrier frequencies to be added.

Furthermore, a sorted list of wireless coverage areas may be generated. The sorted list may be sorted in an order based, at least in part, on the determined priority for each wireless coverage area. As such, the block 560 may comprise scheduling the addition of at least one carrier frequency to at least one wireless coverage area in accordance with the sorted order.

Alternatively, the sorted list of wireless coverage areas may be outputted, perhaps in the form of a report. The outputted sorted list may include all wireless coverage areas in RAN 100, only wireless coverage areas whose determined priority exceeds a threshold priority, or only a number Q of wireless coverage areas with the Q highest determined priorities. Q may be determined by user input. The output of the sorted list also may comprise two values: the ID of the wireless coverage area and the priority of the wireless coverage area.

Furthermore, an embodiment may comprise determining a carrier addition budget B for the addition of B carrier frequencies to RAN 100, wherein an initial value of B may be determined by user input. The embodiment may involve making a first pass through the wireless coverage areas and scheduling the addition of a number of added-carrier frequencies A, where A may be determined by user input, to each wireless coverage area whose priority exceeds a threshold priority. Specifically, A may be one. For the scheduled carrier-frequency addition of A carrier frequencies, the embodiment may involve subtracting A from the then-current value of B. Once B equals 0, the embodiment may terminate the scheduling the addition of carrier frequencies.

However, if B is greater than 0 after comparing the priority of each wireless coverage area to the threshold priority, a second pass through the wireless coverage areas may be made to determine which wireless coverage areas exceed the threshold priority and schedule the addition of A more carrier frequencies to each wireless coverage area exceeding the threshold. Again, for each scheduled carrier-frequency addition, the embodiment may involve subtracting A from the then-current value of B and may terminate if B reaches 0. If B is still greater than 0 after the second pass, the embodiment may comprise making a third pass, and so on. In one embodiment, the process may terminate when B is less than A, as the carrier addition budget B would be exceeded by adding A carrier frequencies to a wireless coverage area.

As an example, suppose the initial value of B is specified to be 8 and that A is specified to be 1. Further suppose that, during the first pass through the wireless coverage areas, the embodiment determined that 6 wireless coverage areas exceeded the threshold priority. For each of the 6 wireless coverage areas in this example, the embodiment would (i) add 1 carrier frequency (as A equals 1) to the wireless coverage area and (ii) subtract 1 from B. Then, at the end of the first pass, B would be 2. As B is greater than 0 at the end of the first pass, the embodiment may make a second pass through the wireless coverage areas, and add one carrier frequency to the first two wireless coverage areas whose priority exceeded the threshold priority. After adding the second of the two carrier frequencies, B would be 0, and the embodiment would then terminate.

Further, multiple threshold priorities and/or added-numbers of carrier frequencies may be used, wherein the first pass uses a first threshold priority and/or schedules the addition of a first added-number of carrier frequencies, the second pass uses a second threshold priority and/or schedules the addition of a second added-number of carrier frequencies, and so on. The threshold priorities and/or the added-numbers of carrier frequencies may be determined by user input.

Some embodiments may further comprise adding one or more carrier frequencies to one or more wireless coverage areas based on the scheduled carrier addition. The one or more carrier frequencies may be added to the one or more wireless coverage areas by a procedure that comprises configuring a BTS and any associated RF equipment, such as antenna equipment, to radiate and provide service on the added carrier frequency.

5. Conclusion

Various exemplary embodiments have been described above. Those skilled in the art will understand, however, that changes and modifications may be made to those examples without departing from the scope of the claims.

What is claimed is:

1. In a radio access network (RAN) that defines a plurality of wireless coverage areas for serving a plurality of mobile nodes, each mobile node requesting a forward-link data rate for data transmission and receiving data at an actual forward-link data rate, a computerized method comprising:
   (a) for each wireless coverage area, a computing device:
      determining an average of actual forward-link data rates, determining an average requested forward-link data rate, and determining a radio-frequency-(RF)-link utilization by applying an algorithm comprising dividing the determined average actual forward-link data rate by the determined average requested forward-link data rate; and
   (b) managing carrier frequencies, wherein managing carrier frequencies comprises scheduling an addition of at least one carrier frequency to at least one wireless coverage area based at least in part on the at least one determined RF-link utilization for the at least one wireless coverage area, wherein the average of the actual forward-link data rates is an average determined over a first period of time, wherein the average requested forward-link data rate is an average determined over a second period of time, and wherein the first period of time differs in duration from the second period of time.

2. The method of claim 1, wherein the RAN comprises a data-communication system providing data service compliant with IS-856.

3. The method of claim 1, wherein managing carrier frequencies further comprises:
for each wireless coverage area, comparing the determined RF-link utilization for the wireless coverage area with a threshold; and
responsive to the RF-link utilization for a given wireless coverage area exceeding the threshold, scheduling an addition of at least one carrier frequency to the given wireless coverage area.

4. The method of claim 1, wherein the first period of time is one hour and the second period of time is 24 hours.

5. The method of claim 4, wherein the first period of time is an hour in which the average of the actual forward-link data rates is at a maximum over the second period of time.

6. The method of claim 1, wherein managing carrier frequencies further comprises:
for each wireless coverage area, determining a priority based at least in part on the RF-link utilization for the wireless coverage area, and
scheduling an addition of at least one carrier frequency to at least one wireless coverage area based at least in part on the determined priority for the at least one wireless coverage area.

7. The method of claim 6, wherein the determined priority is the RF-link utilization for the wireless coverage area.

8. The method of claim 6, wherein scheduling the addition of at least one carrier frequency comprises:
for each wireless coverage area, comparing the determined priority for the wireless coverage area with a threshold priority, and responsive to the determined priority for the wireless coverage area exceeding the threshold priority, scheduling the addition of at least one carrier frequency to the wireless coverage area.

9. The method of claim 6, wherein scheduling the addition of at least one carrier frequency comprises:
scheduling the addition of at least one carrier frequency to each of P wireless coverage areas, wherein the P wireless coverage areas are those having the P highest determined priorities.

10. The method of claim 1, further comprising:
adding at least one carrier frequency to the RAN in accordance with the scheduling.

11. In a radio access network (RAN) that defines a plurality of wireless coverage areas for serving a plurality of mobile nodes, each mobile node requesting a forward-link data rate for data transmission and receiving data at an actual forward-link data rate, a computerized method comprising:
(a) for each wireless coverage area, a computing device:
determining an average of actual forward-link data rates, determining an average requested forward-link data rate, and determining a radio-frequency-(RF)-link utilization by applying an algorithm comprising dividing the determined average actual forward-link data rate by the determined average requested forward-link data rate; and
(b) managing carrier frequencies, wherein managing carrier frequencies comprises:
(i) for each wireless coverage area, determining a priority based at least in part on the RF-link utilization for the wireless coverage area, and
(ii) scheduling an addition of at least one carrier frequency to at least one wireless coverage area based at least in part on the at least one determined RF-link utilization and the determined priority for the at least one wireless coverage area; and
wherein scheduling the addition of at least one carrier frequency comprises: sorting a list of wireless coverage areas in an order based on their determined priorities, and scheduling the addition of at least one carrier frequency to at least one wireless coverage area in accordance with the sorted order.

12. A system comprising:
a network-communication interface for receiving a plurality of communication records associated with a plurality of wireless coverage areas, wherein the plurality of communication records reflect requested forward-link data rates and actual forward-link data rates;
data storage, wherein the received plurality of communication records are stored;
a processing unit; and
machine-language instructions stored in the data storage and executable by the processing unit to perform functions including:
for each wireless coverage area identified in the stored plurality of communication records, determining an average actual forward-link data rate, determining an average requested forward-link data rate, and determining a radio-frequency-(RF)-link utilization by applying an algorithm that comprises dividing the determined average actual forward-link data rate by the determined average requested forward-link data rate,
managing carrier frequencies, wherein managing carrier frequencies comprises scheduling an addition of at least one carrier frequency to at least one wireless coverage area based at least in part on the at least one determined RF-link utilization for the at least one wireless coverage area,
determine a priority for each wireless coverage area identified in the stored plurality of communication records based at least in part on the determined RF-link utilization of the wireless coverage area,
ordering a list of identified wireless coverage areas by priority value, and
output the ordered list of identified wireless coverage areas.

13. The system of claim 12, wherein the priority is the determined RF-link utilization of the wireless coverage area.

14. The system of claim 12, wherein the machine-language instructions are further executable by the processing unit to:
for each wireless coverage area identified in the stored plurality of communication records, compare a threshold priority with the priority for the wireless coverage area, and responsive to the priority for the wireless coverage area exceeding the threshold priority, schedule an addition of at least one carrier frequency to the wireless coverage area.

15. The system of claim 12, wherein the machine-language instructions are further executable by the processing unit to schedule the addition of at least one carrier frequency to each of P wireless coverage areas, wherein the P wireless coverage areas are those having the P highest priority values.

16. The system of claim 15, wherein the machine-language instructions to schedule the addition of at least one carrier frequency to each of the P wireless coverage areas consist of machine-language instructions to schedule the addition of exactly one carrier frequency to each of the P wireless coverage areas.

* * * * *